(12) United States Patent
Kobayashi

(10) Patent No.: US 11,152,727 B2
(45) Date of Patent: Oct. 19, 2021

(54) ELECTRICAL CONNECTOR AND ELECTRICAL CONNECTOR ASSEMBLY

(71) Applicant: HIROSE ELECTRIC CO., LTD., Tokyo (JP)

(72) Inventor: Yuki Kobayashi, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/813,065

(22) Filed: Mar. 9, 2020

(65) Prior Publication Data

US 2020/0295484 A1    Sep. 17, 2020

(30) Foreign Application Priority Data

Mar. 15, 2019   (JP) .............................. JP2019-048114

(51) Int. Cl.
*H01R 24/00*  (2011.01)
*H01R 12/71*  (2011.01)

(52) U.S. Cl.
CPC .................................. *H01R 12/716* (2013.01)

(58) Field of Classification Search
CPC ....... H01R 12/716; H01R 13/20; H01R 12/73
USPC .......................................................... 439/65
See application file for complete search history.

(56) References Cited

U.S. PATENT DOCUMENTS

| | | | |
|---|---|---|---|
| 6,503,101 B1* | 1/2003 | Yu ...................... | H01R 13/6597 439/607.36 |
| 8,888,506 B2* | 11/2014 | Nishimura ......... | H01R 12/7082 439/74 |
| 8,986,027 B2* | 3/2015 | Nishimura ........... | H01R 12/707 439/181 |
| 9,190,752 B1 | 11/2015 | Little et al. | |
| 2005/0032400 A1* | 2/2005 | Zhang .................. | H01R 12/716 439/74 |
| 2005/0042924 A1* | 2/2005 | Zhang ................ | H01R 13/6582 439/607.36 |
| 2006/0063432 A1* | 3/2006 | Chen .................... | H01R 13/658 439/607.36 |
| 2006/0276061 A1* | 12/2006 | Koguchi .............. | H01R 12/725 439/74 |

(Continued)

FOREIGN PATENT DOCUMENTS

| | | |
|---|---|---|
| CN | 105006667 A | 10/2015 |
| JP | 2012-243599 A | 12/2012 |

(Continued)

OTHER PUBLICATIONS

Chinese Office Action (CNOA) dated Mar. 31, 2021 for the corresponding Chinese Patent Application No. 202010174960.5 and its English machine translation.

(Continued)

*Primary Examiner* — Abdullah A Riyami
*Assistant Examiner* — Nelson R. Burgos-Guntin
(74) *Attorney, Agent, or Firm* — Rankin, Hill & Clark LLP

(57) ABSTRACT

Provided is an electrical connector configured to be mounted on a substrate and including a terminal protruding in a direction mating with a mating connector. The terminal is configured to be gripped by a terminal of the mating connector to be in contact with the mating connector terminal when mated with the mating connector, and has a first connecting portion and a second connecting portion exposed on the substrate side.

11 Claims, 10 Drawing Sheets

(56) References Cited

U.S. PATENT DOCUMENTS

| | | | |
|---|---|---|---|
| 2008/0207014 A1* | 8/2008 | Takeuchi | H01R 12/716 439/74 |
| 2008/0305657 A1* | 12/2008 | Midorikawa | H01R 43/0235 439/74 |
| 2009/0061655 A1* | 3/2009 | Miyazaki | H01R 12/57 439/74 |
| 2009/0081903 A1 | 3/2009 | Zhang et al. | |
| 2010/0068900 A1* | 3/2010 | Wu | H01R 12/716 439/74 |
| 2011/0263140 A1* | 10/2011 | Sato | H01R 12/7052 439/74 |
| 2013/0012039 A1* | 1/2013 | Nose | H01R 12/716 439/74 |
| 2015/0079816 A1* | 3/2015 | Suzuki | H01R 12/7082 439/74 |
| 2015/0140840 A1* | 5/2015 | Nishimura | H01R 13/6594 439/74 |
| 2015/0140841 A1* | 5/2015 | Watanabe | H01R 43/18 439/74 |
| 2015/0207248 A1* | 7/2015 | Takenaga | H01R 13/6582 439/74 |
| 2015/0311610 A1 | 10/2015 | Little et al. | |
| 2016/0190719 A1* | 6/2016 | Brzezinski | H01R 12/73 439/74 |
| 2017/0005423 A1 | 1/2017 | Takenaga et al. | |
| 2017/0033505 A1* | 2/2017 | Ozeki | H01R 13/5213 |
| 2018/0248287 A1 | 8/2018 | Ashibu et al. | |
| 2020/0044374 A1* | 2/2020 | Ishida | H01R 12/721 |

FOREIGN PATENT DOCUMENTS

| | | |
|---|---|---|
| JP | 2017-16897 A | 1/2017 |
| JP | 2018-63956 A | 4/2018 |
| JP | 2018-142456 A | 9/2018 |

OTHER PUBLICATIONS

Japanese Office Action (JPOA) dated Jul. 26, 2021 for the corresponding Japanese Patent Application No. 2019-048114 and its English machine translation.

* cited by examiner

ELECTRICAL CONNECTOR AND ELECTRICAL CONNECTOR ASSEMBLY

CROSS-REFERENCE TO RELATED APPLICATION

This application claims priority from Japanese Patent Application No. 2019-048114 filed with the Japan Patent Office on Mar. 15, 2019, the entire content of which is hereby incorporated by reference.

BACKGROUND

1. Technical Field

The present disclosure relates to an electrical connector and an electrical connector assembly.

2. Description of the Related Art

Board-to-board electrical connectors that are attached to circuit boards are known. Typically, the board-to-board electrical connector has been used as a connector for connecting surfaces of the boards. In the board-to-board electrical connector, a plug connector and a receptacle connector form one set. Then, when the plug connector is inserted into the receptacle connector, their contacts (conductive terminals) are in contact with and are electrically connected to each other. Examples of a technique related to such a board-to-board electrical connector include a technique described in JP-A-2017-016897.

SUMMARY

An electrical connector according to an embodiment of the present disclosure is configured to be mounted on a substrate and includes a terminal protruding in a direction mating with a mating connector. The terminal is configured to be gripped by a terminal of the mating connector to be in contact with the mating connector terminal when mated with the mating connector, and has a first connecting portion and a second connecting portion exposed on the substrate side.

DETAILED DESCRIPTION

Figure 1:
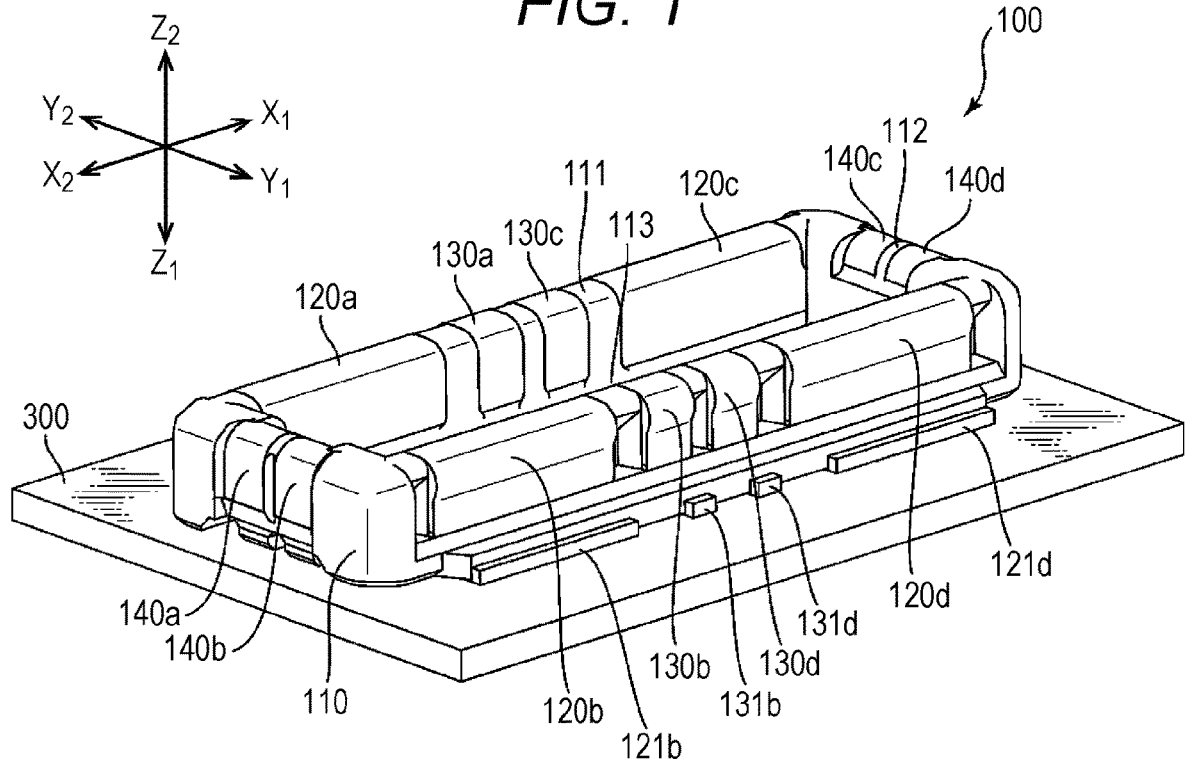
FIG. 1 is a perspective view illustrating an external structure of a plug connector according to an embodiment of the present disclosure (a view as seen from a mating side)

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In recent years, with demand for lighter, thinner and smaller electronic devices such as smart phones, mobile phones, and personal digital assistants, components used therein have been reduced in size and thickness. However, as functions of the electronic devices are more sophisticated, current used in the electronic devices also tends to increase. Further, in general, the electronic devices often use a rechargeable battery as a power source. Therefore, large current may flow through a small electrical connector in order to meet demand for short-time charging. As a result, heat generation due to the large current is a problem. That is, an increase in temperature of the electronic device due to the heat generation may cause a failure of the electronic device.

An electrical connector and an electrical connector assembly according to an embodiment of the present disclosure have been completed to solve the above problems. An object of the present disclosure is to provide a technique capable of suppressing an increase in temperature due to an increase in current flowing through a conductive terminal in the electrical connector and the electrical connector assembly.

The above and other objects of the present disclosure and technical features of the electrical connector and the electrical connector assembly according to the embodiment of the present disclosure will be apparent from the following description and drawings.

A brief description of outline of a representative embodiment among embodiments of the present disclosure is as follows.

That is, an electrical connector according to an embodiment of the present disclosure is configured to be mounted on a substrate and includes a terminal protruding in a direction mating with a mating connector. The terminal is configured to be gripped by a terminal of the mating connector to be in contact with the mating connector terminal when mated with the mating connector, and has a first connecting portion and a second connecting portion exposed on the substrate side.

Moreover, an electrical connector according to another embodiment of the present disclosure is configured to be mounted on a substrate and includes a terminal recessed on the substrate side. The terminal is configured to grip a terminal of a mating connector to be in contact with the mating connector terminal when mated with the mating connector, and has a first connecting portion and a second connecting portion exposed on the substrate side.

Further, an electrical connector assembly according to another embodiment of the present disclosure includes: a first electrical connector configured to be mounted on a first substrate; and a second electrical connector configured to be mounted on a second substrate. The first electrical connector includes a first terminal protruding in a direction mating with the second connector. The second electrical connector includes a second terminal recessed on the second substrate side. The first terminal is configured to be gripped by the second terminal to be in contact with the second terminal when mated with the second electrical connector, and has a first connecting portion and a second connecting portion exposed on the first substrate side. The second terminal is configured to grip the first terminal to be in contact with the first terminal when mated with the first electrical connector, and has a third connecting portion and a fourth connecting portion exposed on the second substrate side.

A brief description of effects provided by the representative embodiment among the embodiments of the present disclosure is as follows.

Each of conductive terminals in the electrical connector has two connecting portions. Therefore, the electrical connector is connected to a circuit pattern on the substrate at two points. As a result, two electrical flow paths are formed. Further, a distance of the path through which electricity flows is reduced. Therefore, an overall resistance is reduced. As a result, even when the large current flows, the heat generation of the conductive terminal can be suppressed. Further, the increase in temperature of the electrical connector is suppressed.

Hereinafter, the embodiments of the present disclosure will be described in detail with reference to the drawings. Note that in all the drawings for describing the embodiments, the same members are denoted by the same reference numerals in principle. Then, a repeated description thereof will be omitted.

In the following embodiments, a plurality of sections or embodiments that are divided depending on a need for convenience will be described. However, unless otherwise expressly specified, the sections or embodiments are not unrelated to each other. One has a relationship with some or all of the other, such as modifications, details, or supplementary explanations. Further, in the following embodiments, when the number of elements (including the number, numerical value, amount, range, and the like) is referred to, for example, except where expressly specified or limited to a specific number in principle, the number of elements is not limited to the specific number mentioned. The number of elements and the like may be more or less than the specific number mentioned.

Figure 2:
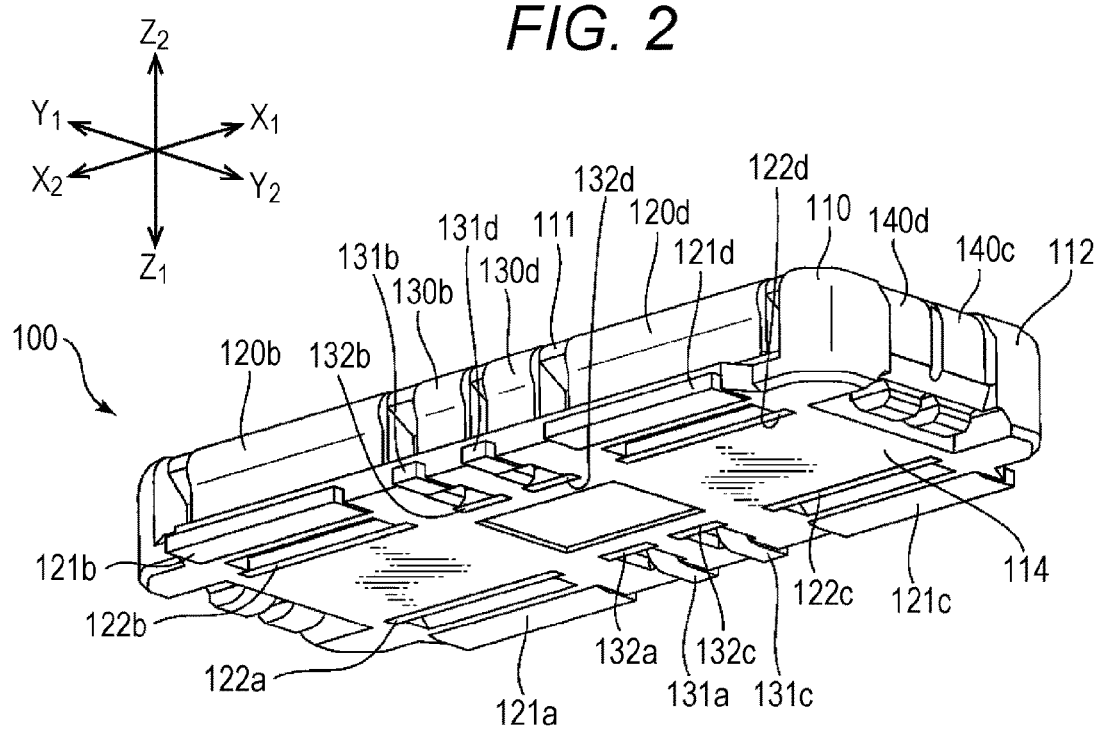
FIG. 2 is a perspective view illustrating the external structure of the plug connector according to the embodiment of the present disclosure (a view as seen from a substrate side)
Figure 3:
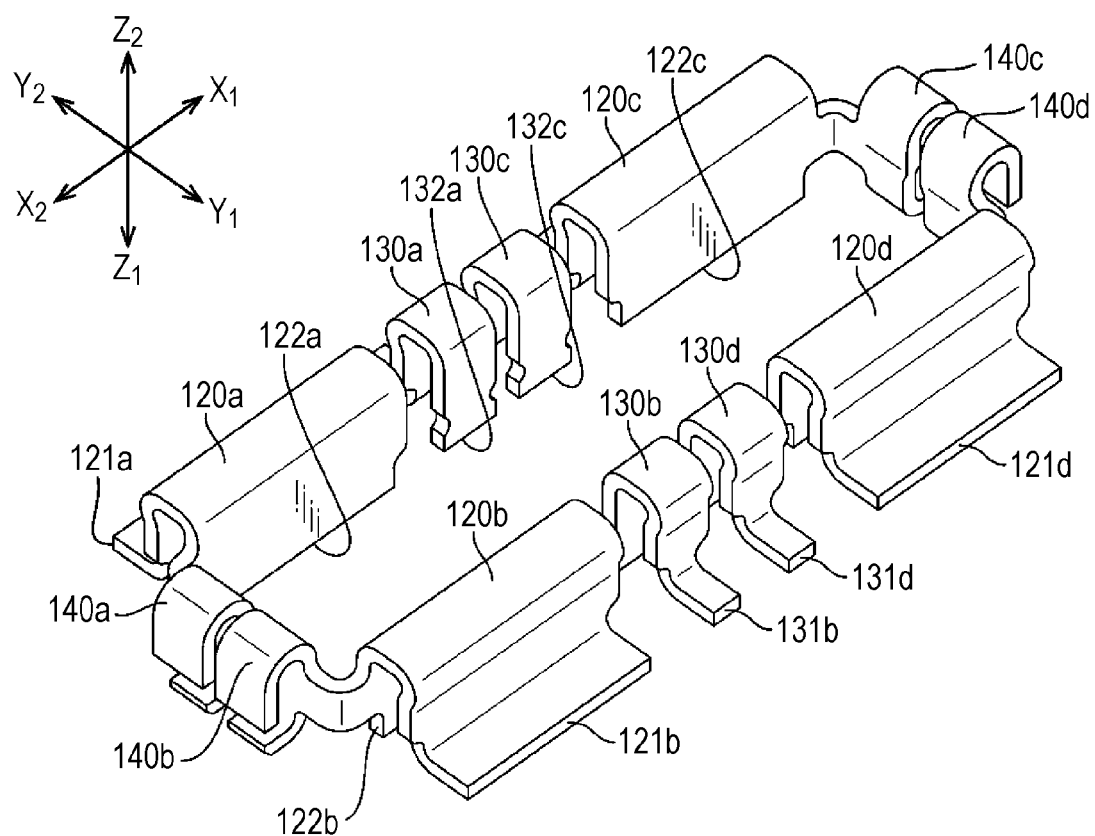
FIG. 3 is a perspective view illustrating a structure of a terminal of the plug connector according to the embodiment of the present disclosure (a view as seen from the mating side)
Figure 4:
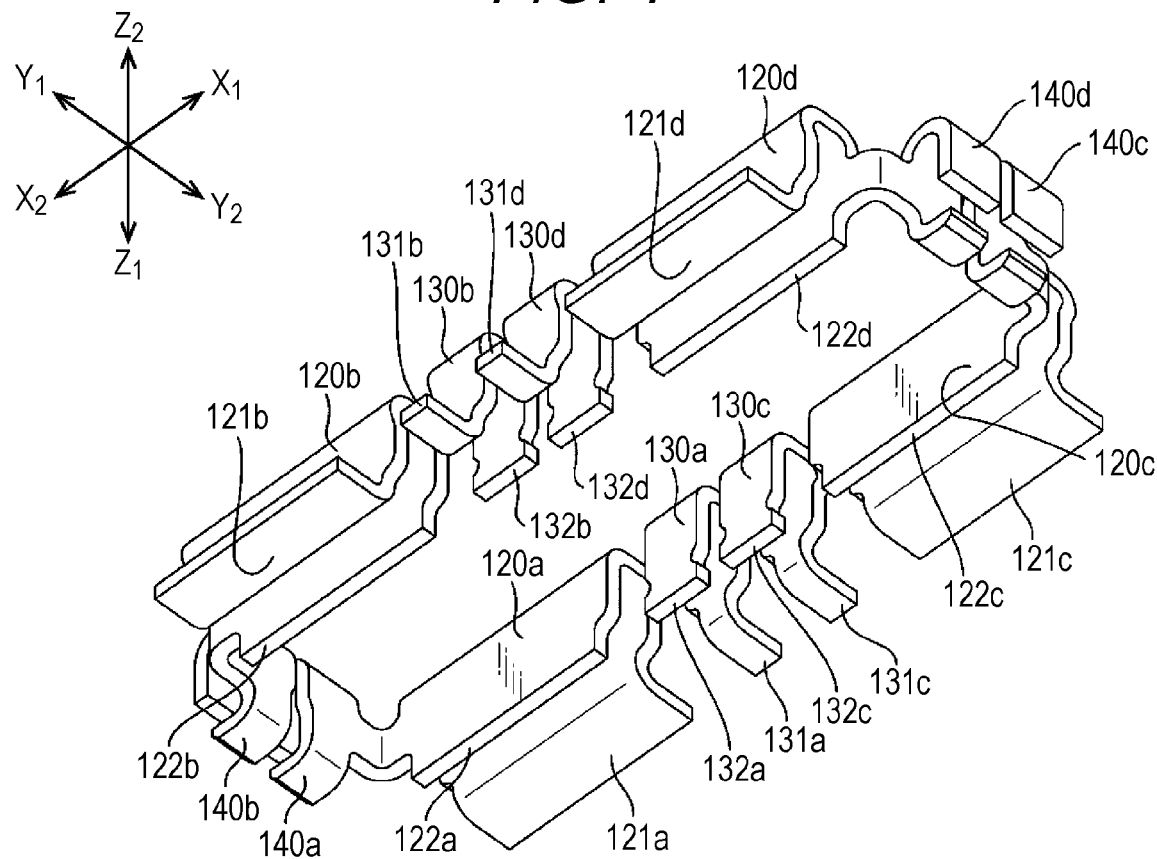
FIG. 4 is a perspective view illustrating the structure of the terminal of the plug connector according to the embodiment of the present disclosure (a view as seen from the substrate side)
Figure 5:
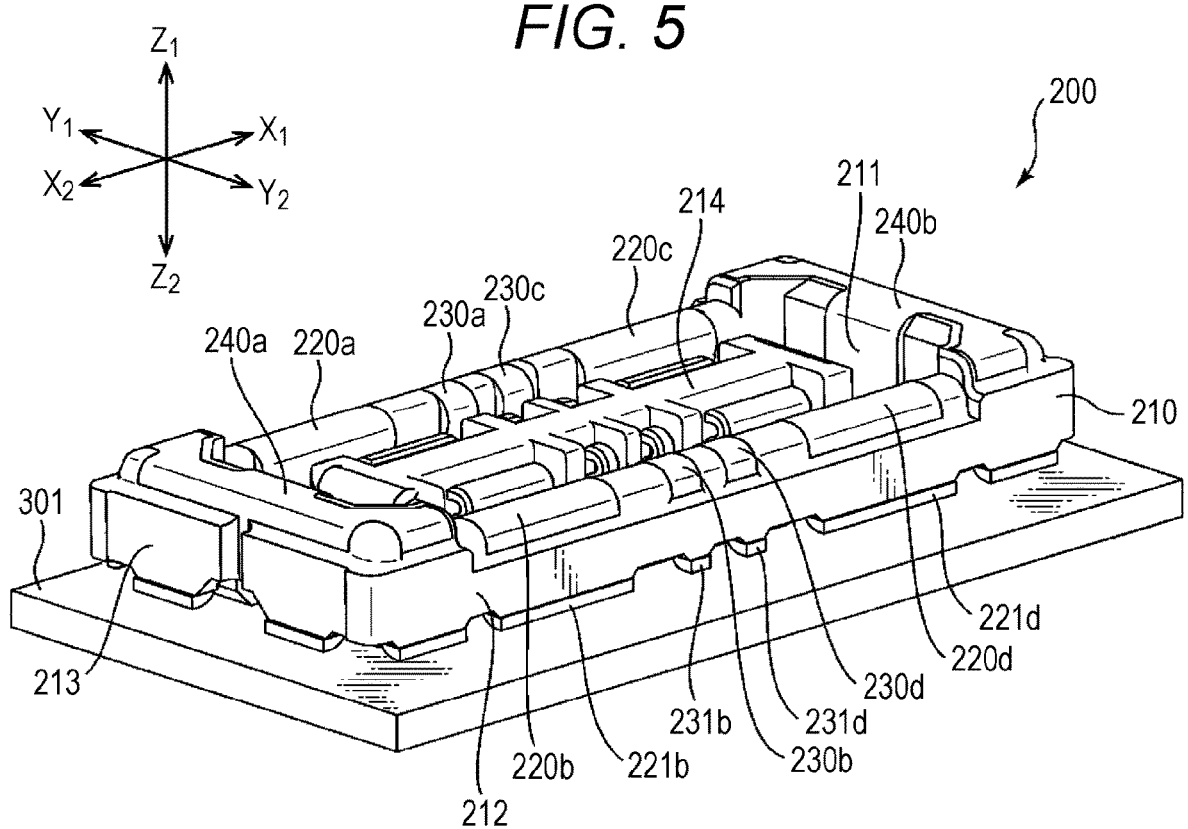
FIG. 5 is a perspective view illustrating an external structure of a receptacle connector according to the embodiment of the present disclosure (a view as seen from the mating side)
Figure 6:
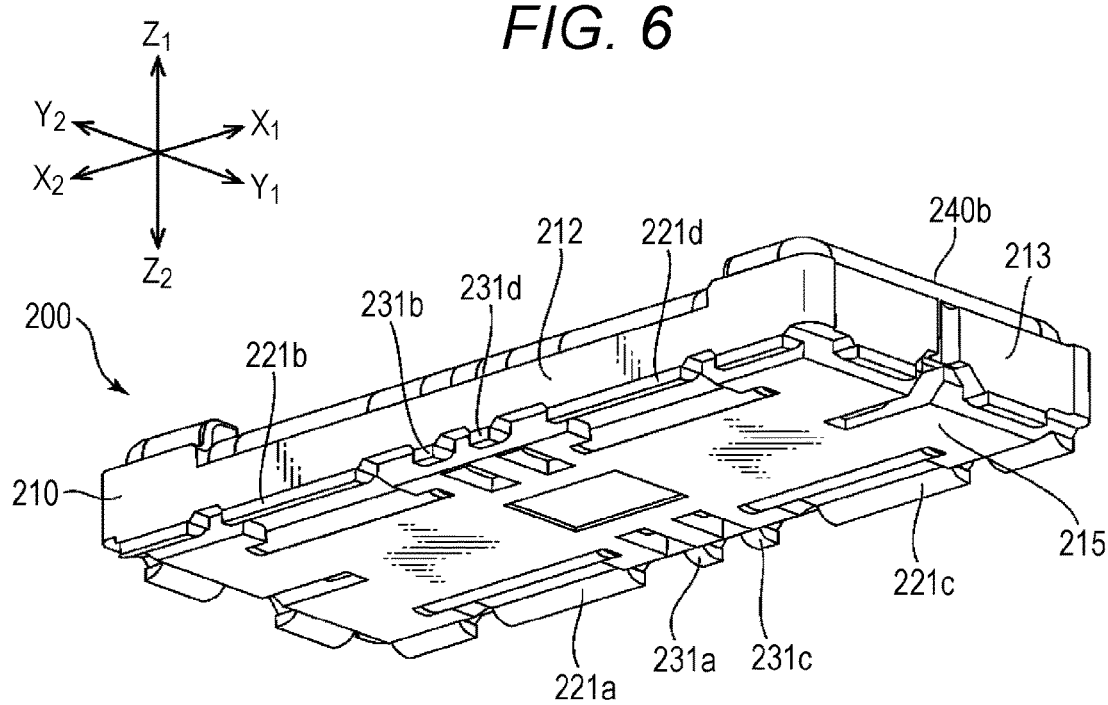
FIG. 6 is a perspective view illustrating the external structure of the receptacle connector according to the embodiment of the present disclosure (a view as seen from the substrate side)
Figure 7:
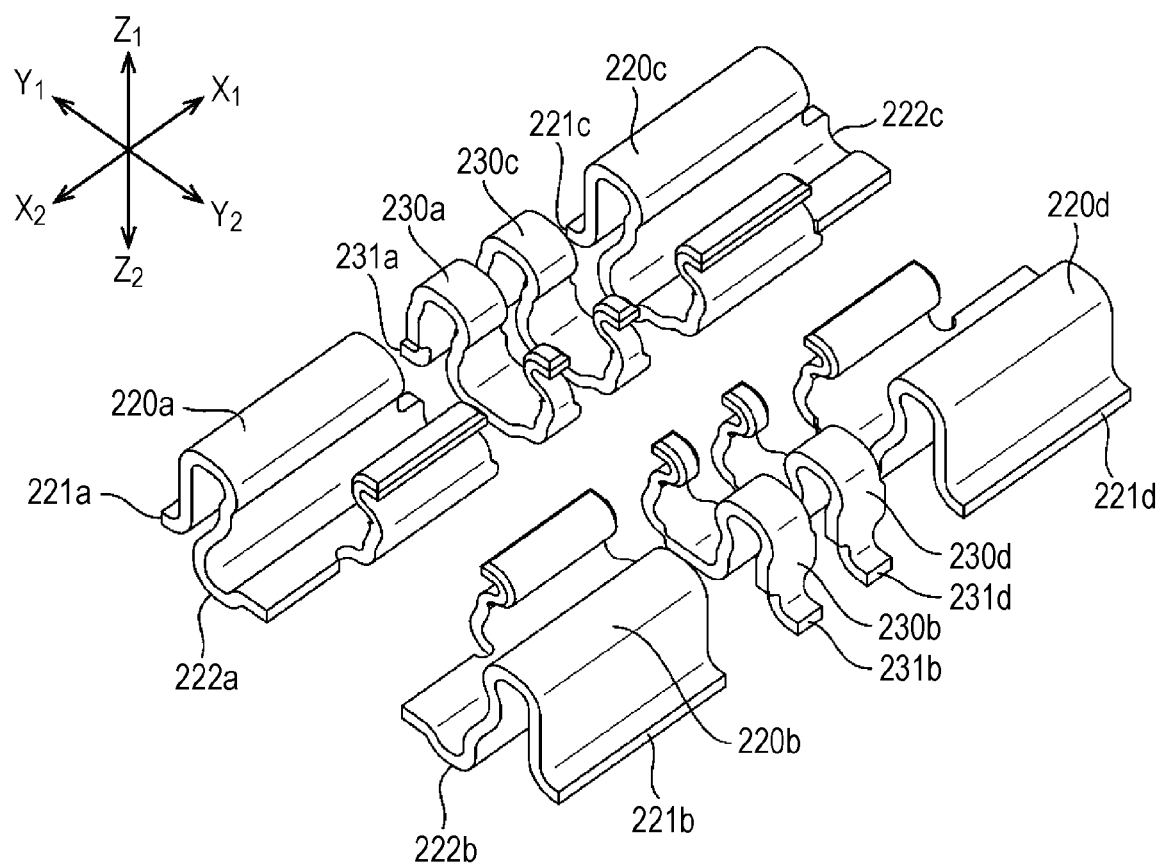
FIG. 7 is a perspective view illustrating a structure of a terminal of the receptacle connector according to the embodiment of the present disclosure (a view as seen from the mating side)
Figure 8:
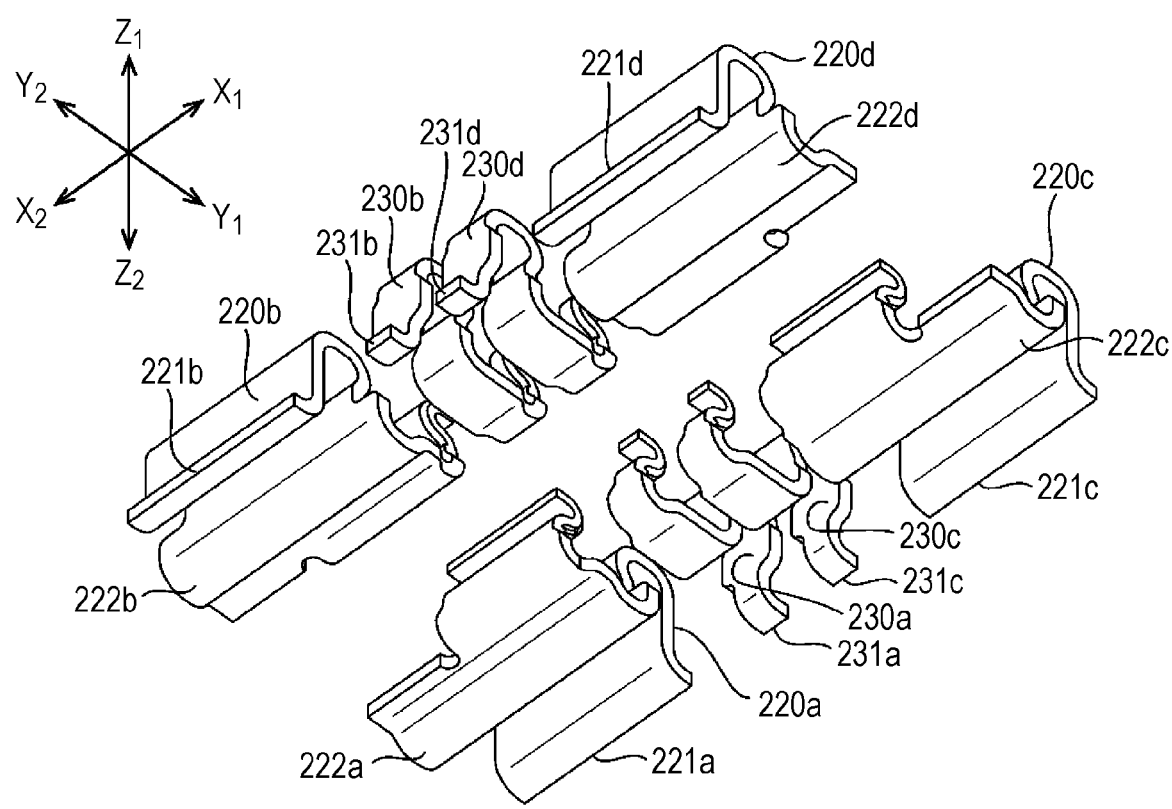
FIG. 8 is a perspective view illustrating the structure of the terminal of the receptacle connector according to the embodiment of the present disclosure (a view as seen from the substrate side)

FIGS. 1 and 2 are perspective views illustrating an external structure of a plug connector according to an embodiment of the present disclosure. FIG. 1 is a view as seen from a mating side. FIG. 2 is a view as seen from a substrate side. FIGS. 3 and 4 are perspective views illustrating a structure of a terminal of the plug connector according to the embodiment of the present disclosure. FIG. 3 is a view as seen from the mating side. FIG. 4 is a view as seen from the substrate side. FIGS. 5 and 6 are perspective views illustrating an external structure of a receptacle connector according to the embodiment of the present disclosure. FIG. 5 is a view as seen from the mating side. FIG. 6 is a view as seen from the substrate side. FIGS. 7 and 8 are perspective views illustrating a structure of a terminal of the receptacle connector according to the embodiment of the present disclosure. FIG. 7 is a view as seen from the mating side. FIG. 8 is a view as seen from the substrate side.

The electrical connector assembly according to the embodiment of the present disclosure includes a plug connector 100 and a receptacle connector 200. The plug connector 100 and the receptacle connector 200 are a type of board-to-board electrical connector that electrically connects circuits on printed circuit boards. In general, the plug connector 100 and the receptacle connector 200 are respectively used mounted on printed circuit boards 300 and 301. The printed circuit boards 300 and 301 are connected with, for example, rechargeable batteries of mobile phones, personal digital assistants, or the like, or their control circuits. When the plug connector 100 and the receptacle connector 200 are mated together, power terminals and signal terminals thereof are in contact with and are electrically connected to each other. Thus, the circuits on the printed circuit boards are electrically connected to each other.

First, the structure of the plug connector 100 according to the present embodiment will be described with reference to FIGS. 1 to 4. The plug connector 100 according to the present embodiment includes an insulating housing 110, four power terminals 120a to 120d held in the housing 110, four signal terminals 130a to 130d held in the housing 110, and four reinforcing brackets 140a to 140d respectively coupled to the power terminals 120a to 120d. The housing 110 includes a pair of side walls 111 in an $X_1X_2$ direction, a pair of end walls 112 in a $Y_1Y_2$ direction connecting ends of the two side walls 111, and a mating recess 113 surrounded by the side walls 111 and the end walls 112. A bottom wall 114 is provided on the substrate side ($Z_1$ side) of the mating recess 113. Further, the power terminals 120a to 120d and the signal terminals 130a to 130d are arranged on upper surfaces of the side walls 111 in a $Z_2$ direction. The reinforcing brackets 140a to 140d are arranged on upper surfaces of the end walls 112 in the $Z_2$ direction. The plug connector 100 is formed, for example, by a method such as integral molding and insert molding. In this molding method, the housing 110 is formed of a resin injected into a mold in which the power terminals 120a to 120d to which the reinforcing brackets 140a to 140d are coupled and the signal terminals 130a to 130d are arranged.

The power terminals 120a to 120d have a convex shape protruding in the mating direction ($Z_2$ direction). The power terminals 120a to 120d respectively include outer connecting portions 121a to 121d (first connecting portions) and inner connecting portions 122a to 122d (second connecting portion) exposed on the substrate side ($Z_1$ side). The outer connecting portions 121a to 121d and the inner connecting portions 122a to 122d are configured to be arranged separated from each other in a connector width direction ($Y_1Y_2$ direction). The outer connecting portions 121a to 121d extend outward from the side walls 111 in the connector width direction ($Y_1Y_2$ direction). A thickness direction ($Z_1Z_2$ direction) of this connecting portion is a direction that intersects a surface (an XY plane) of the printed circuit board 300. The inner connecting portions 122a to 122d are formed as ends penetrating the bottom wall 114 and exposed. A thickness direction ($Y_1Y_2$ direction) of this connecting portion is a direction parallel to the surface (XY plane) of the printed circuit board 300.

The outer connecting portions 121a to 121d and the inner connecting portions 122a to 122d are respectively soldered to individual circuit patterns on the printed circuit board 300 when mounted. Further, a contact portion with a power terminal of the receptacle connector 200 extends in a connector longitudinal direction (the $X_1X_2$ direction) so that the large current can flow through each of the power terminals 120a to 120d. This ensures a sufficient contact area between the terminals. The large current flows through the power terminals 120a to 120d. Therefore, the power terminals 120a to 120d have a larger surface area than the signal terminals 130a to 130d. By increasing the surface area, heat that can be generated when a power supply current flows can be radiated. The power terminals 120a and 120b may have the same potential, and the power terminals 120c and 120d may have the same potential. Here, an amount of current flowing through the power terminals 120a to 120d is not particularly limited. For example, a current of several amperes to several tens of amperes, more specifically, about 5 to 20 amperes can flow.

The signal terminals 130a to 130d have a convex shape in the mating direction ($Z_2$ direction), similarly to the power terminals 120a to 120d. The signal terminals 130a to 130d respectively include outer connecting portions 131a to 131d and inner connecting portions 132a to 132d penetrating the bottom wall 114 on the substrate side ($Z_1$ side) and exposed. The outer connecting portions 131a to 131d and the inner connecting portions 132a to 132d are soldered to the individual circuit patterns on the printed circuit board 300 when mounted. In the present embodiment, the two signal terminals 130a and 130c are arranged adjacent to each other in the connector longitudinal direction ($X_1X_2$ direction). At the same time, the signal terminals 130a and 130c are arranged between the power terminals 120a and 120c. Similarly, the two signal terminals 130b and 130d are arranged adjacent to each other in the connector longitudinal direction ($X_1X_2$ direction). At the same time, the signal terminals 130b and 130d are arranged between the power terminals 120b and 120d.

When the plug connector 100 and the receptacle connector 200 are mated together, the power terminals 120a to 120d are respectively gripped by power terminals 220a to 220d of the receptacle connector 200, to be in contact with the power terminals. At the same time, the signal terminals 130a to 130d are respectively gripped by the signal terminals 230a to 230d of the receptacle connector 200, to be in contact with the signal terminals. Thus, the plug connector 100 and the receptacle connector 200 are electrically connected to each other. The reinforcing brackets 140a to 140d are mounted on the printed circuit board 300 to reinforce strength of the connector. The reinforcing brackets 140a to 140d are respectively integrated with the power terminals 120a to 120d. The same members as the power terminals 120a to 120d are respectively used for the reinforcing brackets 140a to 140d.

Next, the structure of the receptacle connector 200 according to the present embodiment will be described with reference to FIGS. 5 to 8. The receptacle connector 200 according to the present embodiment includes an insulating housing 210, the power terminals 220a to 220d held in the housing 210, the signal terminals 230a to 230d held in the housing 210, and reinforcing brackets 240a and 240b held in the housing 210. The housing 210 includes a pair of side walls 212 in the $X_1X_2$ direction, a pair of end walls 213 in the $Y_1Y_2$ direction connecting ends of the two side walls 212, a mating recess 211 surrounded by the side walls 212 and the end walls 213, an island-like mating protrusion 214 surrounded by the mating recess 211, and a bottom wall 215 of the mating recess 211 on the substrate side ($Z_2$ side). Further, the power terminals 220a to 220d and the signal terminals 230a to 230d are arranged on the upper surface of the side walls 212 in the $Z_1$ direction. The reinforcing brackets 240a and 240b are arranged on the upper surface of the end walls 213 in the $Z_1$ direction. The receptacle connector 200 is formed, for example, by the method such as integral molding and insert molding. In this molding method, the housing 210 is formed of a resin injected into the mold in which the power terminals 220a to 220d, the signal terminals 230a to 230d, and the reinforcing brackets 240a and 240b are arranged.

Each of the power terminals 220a to 220d has a concave shape (a U-shape or an S-shape) recessed on the substrate side ($Z_2$ side). The power terminals 220a to 220d respectively include outer connecting portions 221a to 221d (first connecting portions or third connecting portions) and inner connecting portions 222a to 222d (second connecting portions or fourth connecting portions) penetrating the bottom wall 215 on the substrate side ($Z_2$ side) and exposed. The outer connecting portions 221a to 221d and the inner connecting portions 222a to 222d are configured to be arranged separated from each other in the connector width direction ($Y_1Y_2$ direction). The outer connecting portions 221a to 221d extend outward from the side walls 212 in the width direction ($Y_1Y_2$ direction). The thickness direction ($Z_1Z_2$ direction) of this connecting portion is a direction that intersects the surface (XY plane) of the printed circuit board 301. The inner connecting portions 222a to 222d are formed as portions penetrating the bottom wall 215 and exposed. The thickness direction ($Z_1Z_2$ direction) of this connecting portion is the direction that intersects the surface (XY plane) of the printed circuit board 301.

The outer connecting portions 221a to 221d and the inner connecting portions 222a to 222d are respectively soldered to the individual circuit patterns on the printed circuit board 301 when mounted. Further, a contact portion with a power terminal of the plug connector 100 extends in the connector longitudinal direction ($X_1X_2$ direction) so that the large current can flow through each of the power terminals 220a to 220d. The large current flows through the power terminals 220a to 220d. Therefore, the power terminals 220a to 220d have a larger surface area than the signal terminals 230a to 230d. By increasing the surface area, the heat that can be generated when the power supply current flows can be radiated. Further, the power terminals 220a and 220b may have the same potential, and the power terminals 220c and 220d may have the same potential.

Each of the signal terminals 230a to 230d has a concave shape (U-shape) recessed on the substrate side ($Z_2$ side). The signal terminals 230a to 230d respectively have connecting portions 231a to 231d on the substrate side. The connecting portions 231a to 231d are respectively soldered to the circuit patterns on the printed circuit board.

When the plug connector 100 and the receptacle connector 200 are mated together, the power terminals 220a to 220d respectively grip the power terminals 120a to 120d of the plug connector 100, to be in contact with the power terminals. At the same time, the signal terminals 230a to 230d respectively grip the signal terminals 130a to 130d of the plug connector 100, to be in contact with the signal terminals. Thus, the plug connector 100 and the receptacle connector 200 are electrically connected to each other. The reinforcing brackets 240a and 240b are mounted on the printed circuit board 301 to reinforce the strength of the connector.

When the plug connector 100 and the receptacle connector 200 are mated together, a protrusion of the plug connector 100 fits into a rectangular mating recess 211 of the receptacle connector 200. The power terminals and the signal terminals are arranged in the protrusion. In this way, the terminals are electrically connected to each other. The power terminals 220a to 220d and the signal terminals 230a to 230d have elasticity expanding in a short direction ($Y_1Y_2$ direction) of the connector. In this way, the power terminals 220a to 220d and the signal terminals 230a to 230d are respectively configured to grip the power terminals and the signal terminals of the plug connector 100 from both sides.

Figure 9:
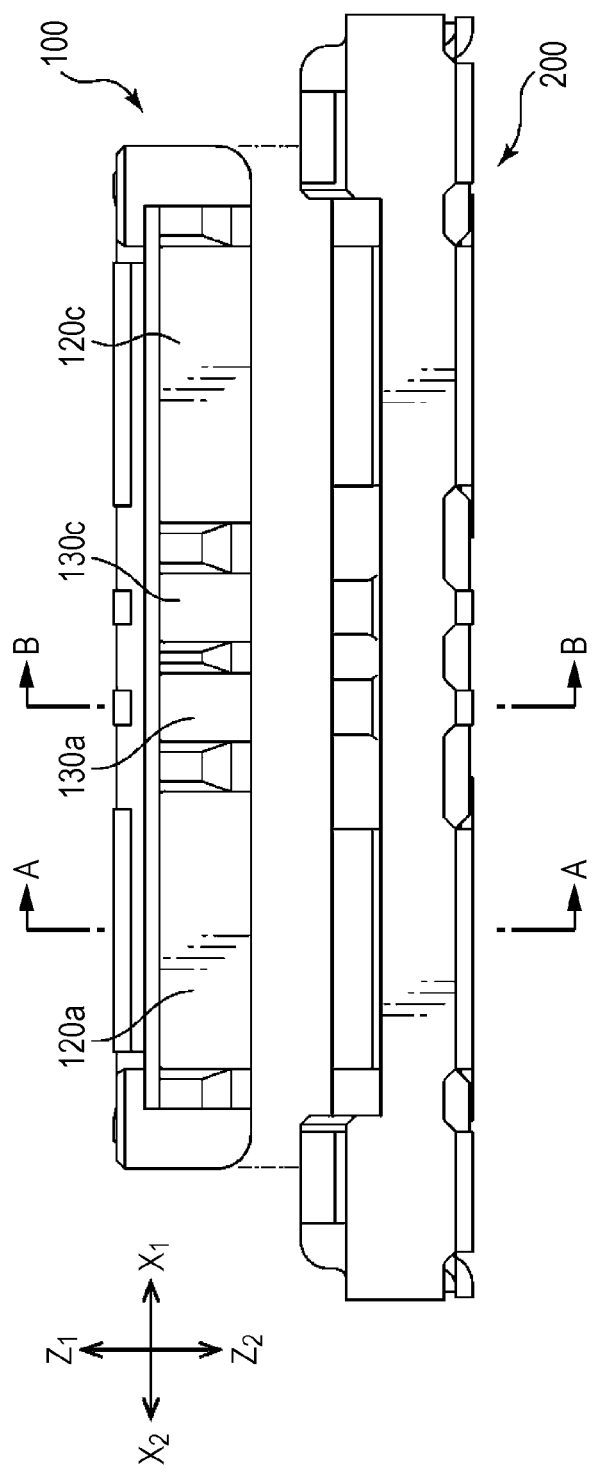
FIG. 9 is a front view illustrating a structure before mating of the plug connector and the receptacle connector according to the embodiment of the present disclosure.
Figure 10:
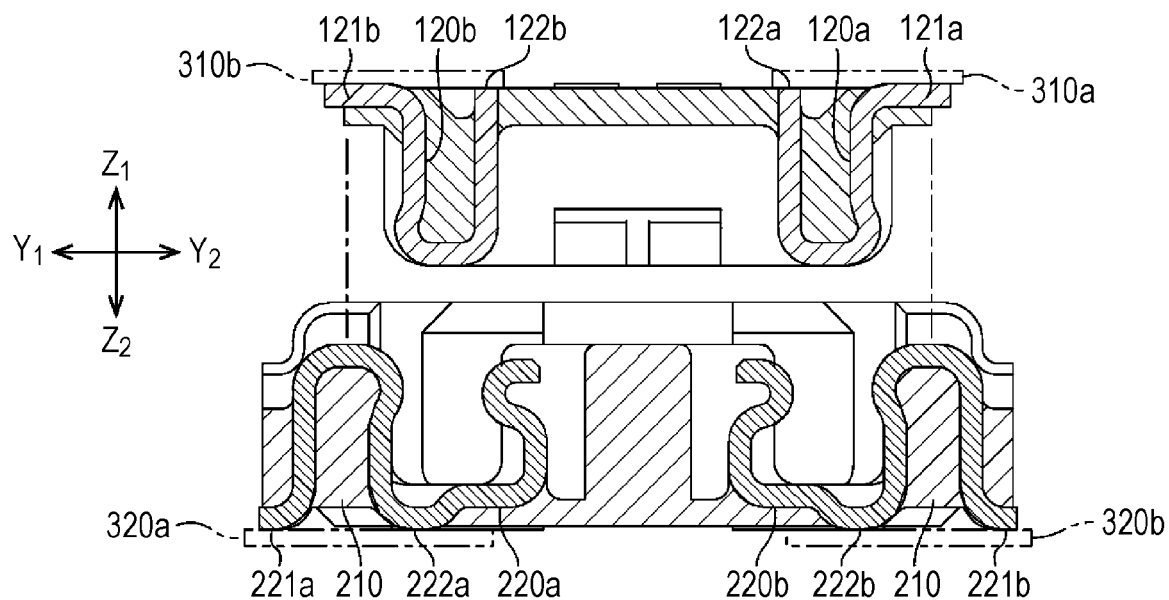
FIG. 10 is a cross-sectional view taken along line A-A in FIG. 9.
Figure 11:
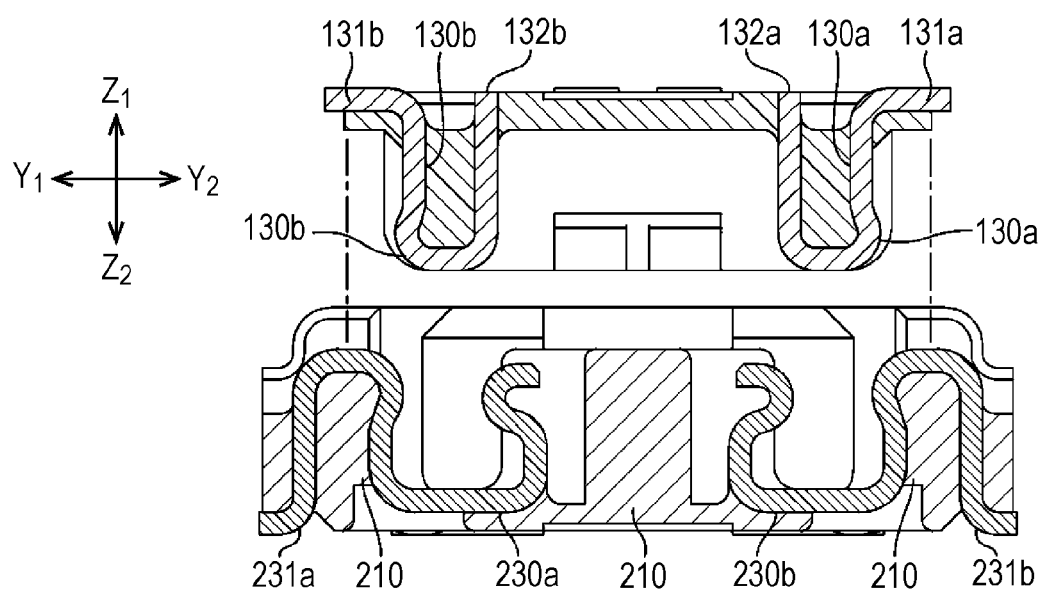
FIG. 11 is a cross-sectional view taken along line B-B of FIG. 9.
Figure 12:
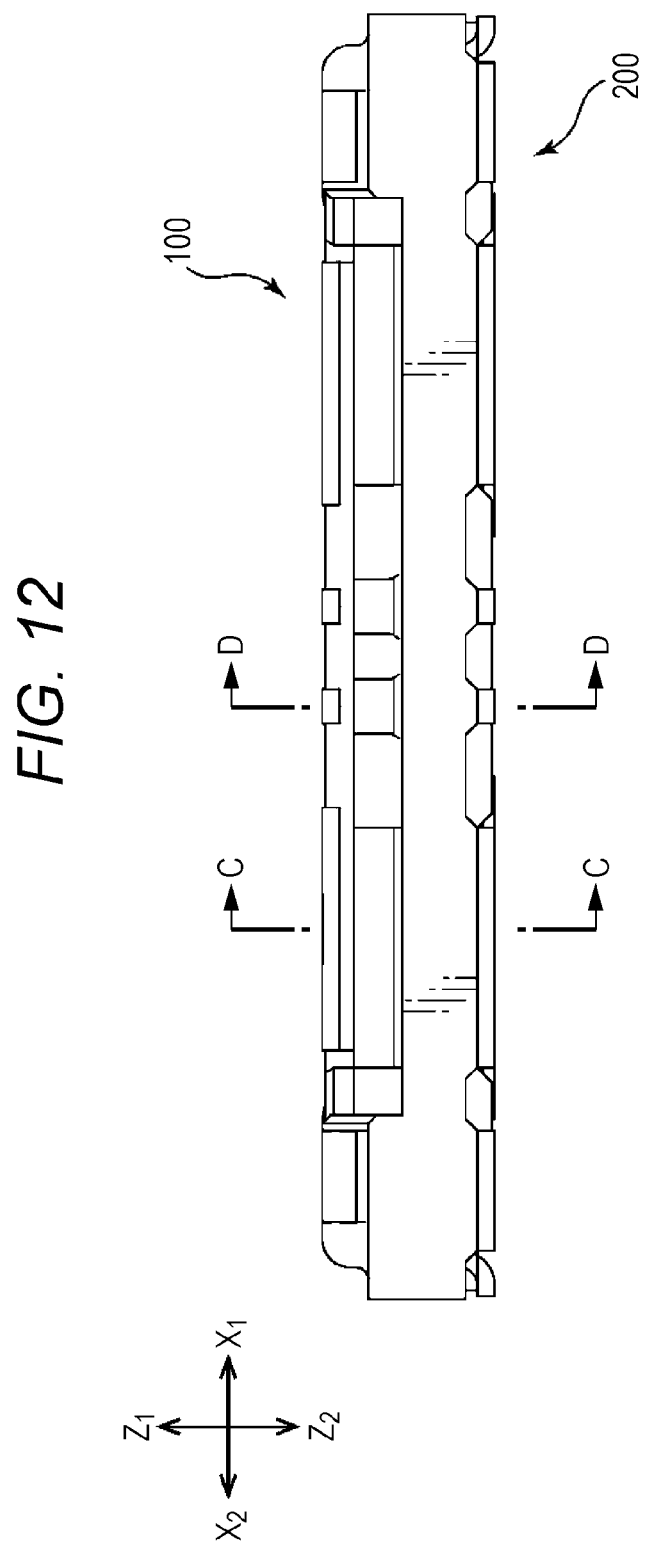
FIG. 12 is a front view illustrating a structure when the plug connector and the receptacle connector according to the embodiment of the present disclosure are mated together.
Figure 13:
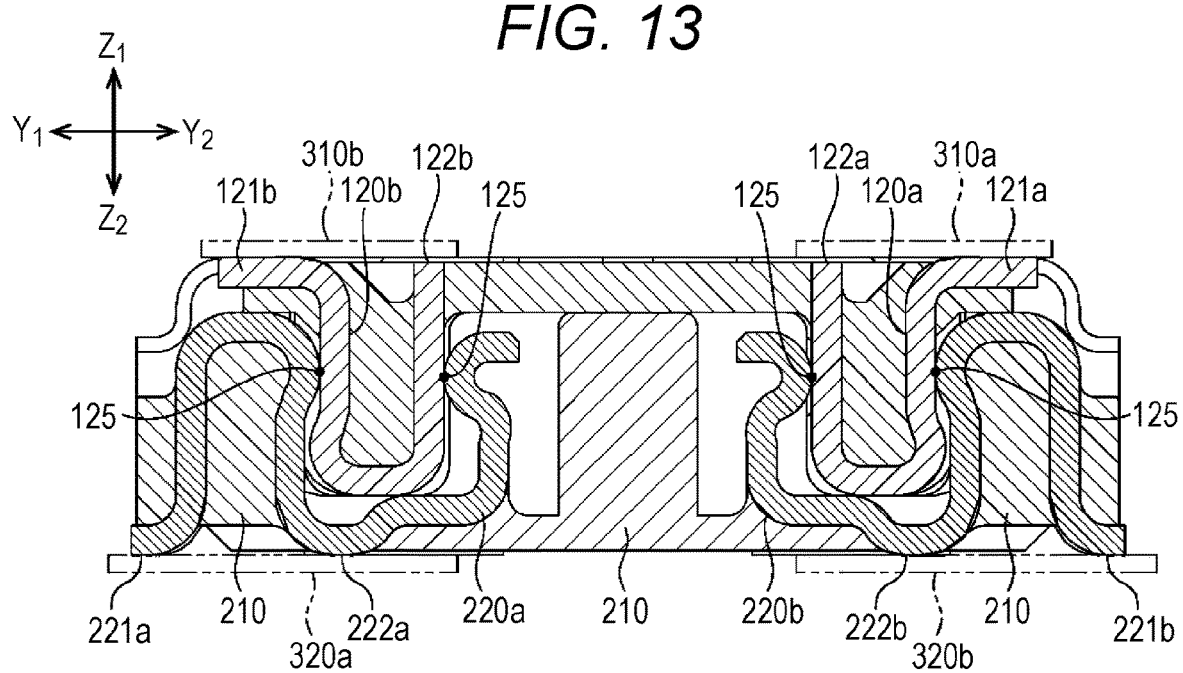
FIG. 13 is a cross-sectional view taken along line C-C of FIG. 12.
Figure 14:
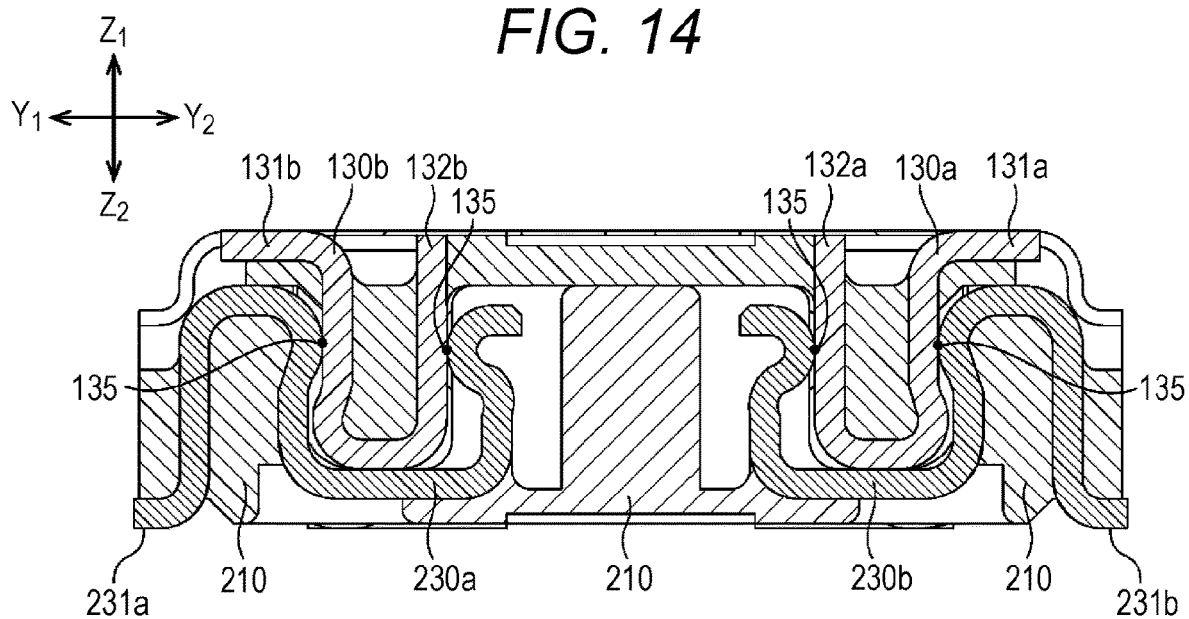
FIG. 14 is a cross-sectional view taken along line D-D in FIG. 12.

FIG. 9 is a front view illustrating a structure before matting of the plug connector and the receptacle connector according to the embodiment of the present disclosure. FIG. 10 is a cross-sectional view taken along line A-A in FIG. 9. FIG. 11 is a cross-sectional view taken along line B-B of FIG. 9. FIG. 12 is a front view illustrating a structure when the plug connector and the receptacle connector according to the embodiment of the present disclosure are mated together. FIG. 13 is a cross-sectional view taken along line C-C of FIG. 12, and FIG. 14 is a cross-sectional view taken along line D-D in FIG. 12.

As illustrated in FIGS. 9 to 14, in the outer connecting portions 121a to 121d of the power terminals 120a to 120d of the plug connector 100, outer ends of the terminals are exposed on the substrate side. Further, in the inner connecting portions 122a to 122d, inner ends of the terminals are exposed on the substrate side. The outer connecting portions 121a to 121d and the inner connecting portions 122a to 122d are soldered to the circuit patterns of the printed circuit board 300. At this time, the outer connecting portion 121a and the inner connecting portion 122a are connected to the same circuit pattern 310a on the substrate. The outer connecting portion 121b and the inner connecting portion 122b are connected to the same circuit pattern 310b on the substrate. The outer connecting portion 121c and the inner connecting portion 122c are connected to the same circuit pattern on the substrate. The outer connecting portion 121d and the inner connecting portion 122d are connected to the same circuit pattern on the substrate. Similar to the power terminals 120a to 120d, the signal terminals 130a to 130d also respectively have the outer connecting portions 131a to 131d and the inner connecting portions 132a to 132d exposed on the substrate side ($Z_1$ side). As illustrated in FIG. 11, the cross-sectional shape of the signal terminals 130a to 130d in the short direction (a YZ plane) of the connector is substantially the same as the cross-sectional shape of the power terminals 120a to 120d in the short direction (YZ plane) of the connector. Thus, since the cross-sectional shapes are substantially the same, the insert molding is facilitated.

In the outer connecting portions 221a to 221d of the power terminals 220a to 220d of the receptacle connector 200, the outer ends of the terminals are exposed to the substrate side. Further, in the inner connecting portions 222a to 222d, a portion recessed in a "U" shape at center of the terminal is exposed to the substrate side. The outer connecting portions 221a to 221d and the inner connecting portions 222a to 222d are soldered to the circuit patterns of the printed circuit board 301. At this time, the outer connecting portion 221a and the inner connecting portion 222a are connected to the same circuit pattern 320a on the substrate. The outer connecting portion 221b and the inner connecting portion 222b are connected to the same circuit pattern 320b on the substrate. The outer connecting portion 221c and the inner connecting portion 222c are connected to the same circuit pattern on the substrate. The outer connecting portion 221d and the inner connecting portion 222d are connected to the same circuit pattern on the substrate.

When the plug connector 100 and the receptacle connector 200 are mated together, the power terminals 220a to 220d respectively grip the power terminals 120a to 120d of the plug connector 100, to be in contact with the power terminals at a plurality of contacts. At the same time, the signal terminals 230a to 230d respectively grip the signal terminals 130a to 130d of the plug connector 100, to be in contact with the signal terminals at a plurality of contacts. Thus, the plug connector 100 and the receptacle connector 200 are electrically connected to each other.

A typical conductive terminal is connected to the circuit pattern on the substrate at only one point of the outer connecting portion. Therefore, a distance between the connecting portion of the plug connector conductive terminal with the circuit pattern and the connecting portion of the receptacle connector conductive terminal with the circuit pattern is long. As a result, the resistance tends to increase. In the present embodiment, the connector conductive terminal has an inner connecting portion in addition to the outer connecting portion. Therefore, the connector conductive terminal is connected to the circuit pattern on the substrate at two points. Therefore, two paths through which electricity flows are formed (parallel connection). Further, the distance between the connecting portion of the plug connector conductive terminal with the circuit pattern and the connecting portion of the receptacle connector conductive terminal with the circuit pattern is short. Therefore, the overall resistance is small. As a result, even when the large current flows, the heat generation of the terminal can be suppressed. Further, since each terminal is connected to the circuit pattern on the substrate at two points, connection strength with the substrate is also increased.

The electrical connector and the electrical connector assembly developed by the present inventors have been specifically described based on the embodiments. However, the embodiments of the present disclosure are not limited to the above-described embodiments. It goes without saying that the above-described embodiment can be variously modified without departing from the gist of the present disclosure.

For example, in the above embodiment, the thickness direction ($Y_1Y_2$ direction) of the inner connecting portions 122a to 122d of the power terminals in the plug connector 100 is a direction parallel to the surface (XY plane) of the printed circuit board 300. However, the power terminal may be bent to be formed such that the thickness direction intersects the surface (XY plane) of the printed circuit board 300.

For example, in the above-described embodiments, the signal terminal of the receptacle connector does not have the inner connecting portion. However, similarly to the power terminal, the signal terminal may be provided with the inner connecting portion. For example, when the number of signal terminals is large, the current of the entire signal terminal increases. Therefore, the heat generation of the terminal may be a problem. In that case, the heat generation of the terminal can be suppressed by the inner connecting portion also provided in the signal terminal.

The embodiments of the board-to-board connector for connecting the printed circuit boards has been described above. However, the embodiments of the present disclosure are not limited to the embodiments. The connector according to the present embodiments is applicable to other electrical connectors.

The electrical connector according to the present embodiment can be widely used for industrial use, business use, home use, and the like.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electrical connector configured to be mounted on a first substrate, comprising a terminal protruding in a direction mating with a mating connector mounted on a second substrate different from the first substrate, wherein
the terminal is configured to be gripped by a mating connector terminal of the mating connector to be in contact with the mating connector terminal when mated with the mating connector,
the terminal has a first connecting portion and a second connecting portion exposed on the first substrate side, and
the first connecting portion and the second connecting portion are configured to be soldered to a circuit pattern on the first substrate.

2. The electrical connector according to claim 1, wherein the terminal is a power terminal.

3. The electrical connector according to claim 2, further comprising a signal terminal having a third connecting portion and a fourth connecting portion exposed on the first substrate side.

4. The electrical connector according to claim 3, wherein a cross-sectional shape of the signal terminal in a short direction of the electrical connector is substantially the same as a cross-sectional shape of the power terminal in the short direction of the electrical connector.

5. An electrical connector configured to be mounted on a first substrate, comprising a terminal recessed on the first substrate side, wherein
the terminal is configured to grip a mating connector terminal of a mating connector mounted on a second substrate different from the first substrate to be in contact with the mating connector terminal when mated with the mating connector,
the terminal has a first connecting portion and a second connecting portion exposed on the first substrate side, and
the first connecting portion and the second connecting portion are configured to be soldered to a circuit pattern on the first substrate.

6. The electrical connector according to claim 5, wherein the terminal is a power terminal.

7. The electrical connector according to claim 1, wherein the circuit pattern to which the first connecting portion is soldered is the same as the circuit pattern to which the second connecting portion is soldered.

8. The electrical connector according to claim 5, wherein the circuit pattern to which the first connecting portion is soldered is the same as the circuit pattern to which the second connecting portion is soldered.

9. An electrical connector assembly comprising:
a first electrical connector configured to be mounted on a first substrate; and
a second electrical connector configured to be mounted on a second substrate different from the first substrate, wherein
the first electrical connector includes a first terminal protruding in a direction mating with the second electrical connector,
the second electrical connector includes a second terminal recessed on the second substrate side,
the first terminal is configured to be gripped by the second terminal to be in contact with the second terminal when mated with the second electrical connector, and the first terminal has a first connecting portion and a second connecting portion exposed on the first substrate side, and
the second terminal is configured to grip the first terminal to be in contact with the first terminal when mated with the first electrical connector, and the second terminal has a third connecting portion and a fourth connecting portion exposed on the second substrate side,
the first connecting portion and the second connecting portion are configured to be soldered to a first circuit pattern on the first substrate, and
the third connecting portion and the fourth connecting portion are configured to be soldered to a second circuit pattern on the second substrate.

10. The electrical connector assembly according to claim 9, wherein the first terminal and the second terminal are power terminals.

11. The electrical connector assembly according to claim 9, wherein
the first circuit pattern to which the first connecting portion is soldered is the same as the first circuit pattern to which the second connecting portion is soldered, and
the second circuit pattern to which the third connecting portion is soldered is the same as the second circuit pattern to which the fourth connecting portion is soldered.

* * * * *